United States Patent [19]

Schäfer

[11] 4,438,833

[45] Mar. 27, 1984

[54] PISTON FOR A PNEUMATIC, HYDRAULIC, OR HYDROPNEUMATIC INSTALLATION

[75] Inventor: Willi Schäfer, Koblenz, Fed. Rep. of Germany

[73] Assignee: Stabilus GmbH, Koblenz-Neuendorf, Fed. Rep. of Germany

[21] Appl. No.: 306,383

[22] Filed: Sep. 28, 1981

[30] Foreign Application Priority Data

Oct. 22, 1980 [DE] Fed. Rep. of Germany ....... 3039801

[51] Int. Cl.³ ............................................... F16F 9/19
[52] U.S. Cl. .................................. 188/320; 188/322.15
[58] Field of Search .............. 188/281, 282, 319, 320, 188/322.15

[56] References Cited

U.S. PATENT DOCUMENTS

| 3,323,550 | 6/1967 | Lee . | |
|---|---|---|---|
| 3,362,508 | 1/1968 | Mayer | 188/319 |
| 3,672,474 | 6/1972 | Mayer et al. | 188/282 |

FOREIGN PATENT DOCUMENTS

| 2057275 | 5/1972 | Fed. Rep. of Germany . | |
|---|---|---|---|
| 7833144 | 3/1979 | Fed. Rep. of Germany . | |
| 845638 | 5/1939 | France | 188/320 |
| 371764 | 4/1932 | United Kingdom . | |
| 728495 | 4/1955 | United Kingdom . | |
| 1271268 | 4/1972 | United Kingdom . | |
| 1483474 | 8/1977 | United Kingdom . | |

OTHER PUBLICATIONS

"Technical Hydraulic Handbook", 5th Ed., The Lee Company, Westbrook, Connecticut, pp. 88-131, (1971).

Primary Examiner—Duane A. Reger
Attorney, Agent, or Firm—Brumbaugh, Graves, Donohue & Raymond

[57] ABSTRACT

A piston for a pneumatic, hydraulic or hydropneumatic fluid-filled cylinder includes a constantly open throttled passage therethrough comprised by at least one spiral-shaped throttled channel extending in a plane perpendicular to the piston axis. The spiral configuration of the throttled channel permits the use of a relatively large flow cross section in the channel, thereby preventing clogging of the throttling passage by contaminants entrained in the damping medium, while still providing the desired damping effect.

7 Claims, 5 Drawing Figures

PISTON FOR A PNEUMATIC, HYDRAULIC, OR HYDROPNEUMATIC INSTALLATION

BACKGROUND

1. Field of the Invention

The present invention relates to an improved piston adapted to be used in a pneumatic, hydraulic, or hydropneumatic installation.

2. The Prior Art

Installations of the type referred to typically include a cylinder, a piston slidably housed within the cylinder and being provided with damping means and being connected to a piston rod, the cavity of the cylinder being filled with gas and/or liquid and being separated by the piston into two working chambers, the piston rod extending through guiding and sealing means provided at one end of the cylinder, and the damping means comprising a constantly open throttled passage between said working chambers.

German Gebrauchmuster No. 7,833,144 describes, for example, a gas spring having a constantly open passage between the working chambers, the passage being defined by a throttled bore through the piston extending parallel to the axis of the piston. This throttled bore is effective only when the piston rod moves out of the cylinder and is adapted to limit the rate of movement of the piston rod out of the cylinder to a predetermined measure. Especially in gas springs having a high internal pressure, these throttled bores have a cross-section of about from 0.3 to 0.4 mm $\phi$ to achieve the desired damping effect. Due to this narrow cross-section, the bores are susceptible to clogging, as even extremely small impurities can occlude this cross-section. Furthermore, these bores must be made very precisely to maintain the damping effect within the required tolerance.

SUMMARY

It is the object of the present invention to overcome the disadvantages of the conventional constructions and to provide a damping means for a piston movable within a cylinder, which damping means is simple to manufacture and moreover is very reliable in operation. Furthermore, it is desired to hold the damping effect of the damping means within the required tolerance.

According to the present invention this and other objects are accomplished in that the constantly open throttled passage comprises at least one spiral throttled channel extending in a plane perpendicular to the axis of the piston. The spiral design of the throttled channel allows the channel to be relatively long and to have a correspondingly large cross-section, so that clogging caused by impurities entrained by the damping medium is prevented. The desired damping effect can be achieved in a simple manner by modifying, as needed, the length and the cross-section of the channel. Such a relatively large cross-section of the channel has the advantage that impurities which might be entrained in the damping medium cannot deposit, but are instead removed from the throttled channel by the damping medium.

In accordance with a further feature of the present invention, the throttled channel extends in the plane perpendicular to the axis of the piston along an angle or more than 360°. Due to the spiral design, it is thus easy to provide a throttled passage of great length at one front end of the piston. In order to achieve a predetermined flow resistance, the cross-section of said throttled channel can, therefore, be correspondingly large. For this reason, the pitch selected for the spiral is decisive for the length of the channel and can be readily adapted to the required damping effect.

According to a further feature of the present invention, at least one axial bore provided within the piston body terminates in the throttled channel in the region of its radially inner end, to make sure that damping fluid flows through the throttled channel over its entire length. It is of advantage to provide the axial bores with larger cross-sections than the throttled channel so that merely the throttled channel acts as a damping means and no special requirements of the axial bore itself must be fulfilled. Hence the axial bore need not be provided after the piston has been manufactured, but can be made at the same time as the piston is sintered, die-cast or injection-molded. The making of the throttled channel as such is very simple because, according to a further feature of the present invention, this throttled channel extends at the front end of the piston body and is covered by a piston plate. The piston body including the throttled channel thus is simple and inexpensive to manufacture. Moreover, the present die-casting, sintering, and injection-molding techniques allow for high precision manufacture of the groove-shaped channel within the piston body.

In the front face of the piston body, the throttled channel is preferably covered by a piston plate which can be a planar member made of plastic material or of a composite material. It is also possible to provide this throttled channel in a piston plate. In either case, the radially outer end of the throttled channel terminates in one of the working chambers.

If great damping forces are required or if a relatively large cross-section of the channel is desired, it is possible according to the present invention to arrange a spiral throttled channel on both sides of the piston body and to connect the radially inner ends of the channel by means of an axial bore. According to a further feature of the invention, it is advantageous to provide the outlet slot or the inlet slot, respectively, of the throttled channel approximately tangentially to the peripheral surface of the piston.

Details of the invention follow from the description of the illustrated embodiments.

DESCRIPTION OF THE PREFERRED EMBODIMENT

The preferred embodiment of the present invention is a gas spring which presents a pneumatic installation, and which produces an outward force acting on the piston rod which corresponds to the product of the cross-sectional area of the piston rod and the pressure within the cylinder. The invention can of course be used for any other pneumatic, hydraulic, or hydropneumatic installations in which a dampened movement of the piston rod is to be provided. In particular, in gas springs which are installed, for example, as operating aids for opening a flap swinging about a horizontal axis, damping means are used to prevent rapid movement of the piston rod.

Figure 1:
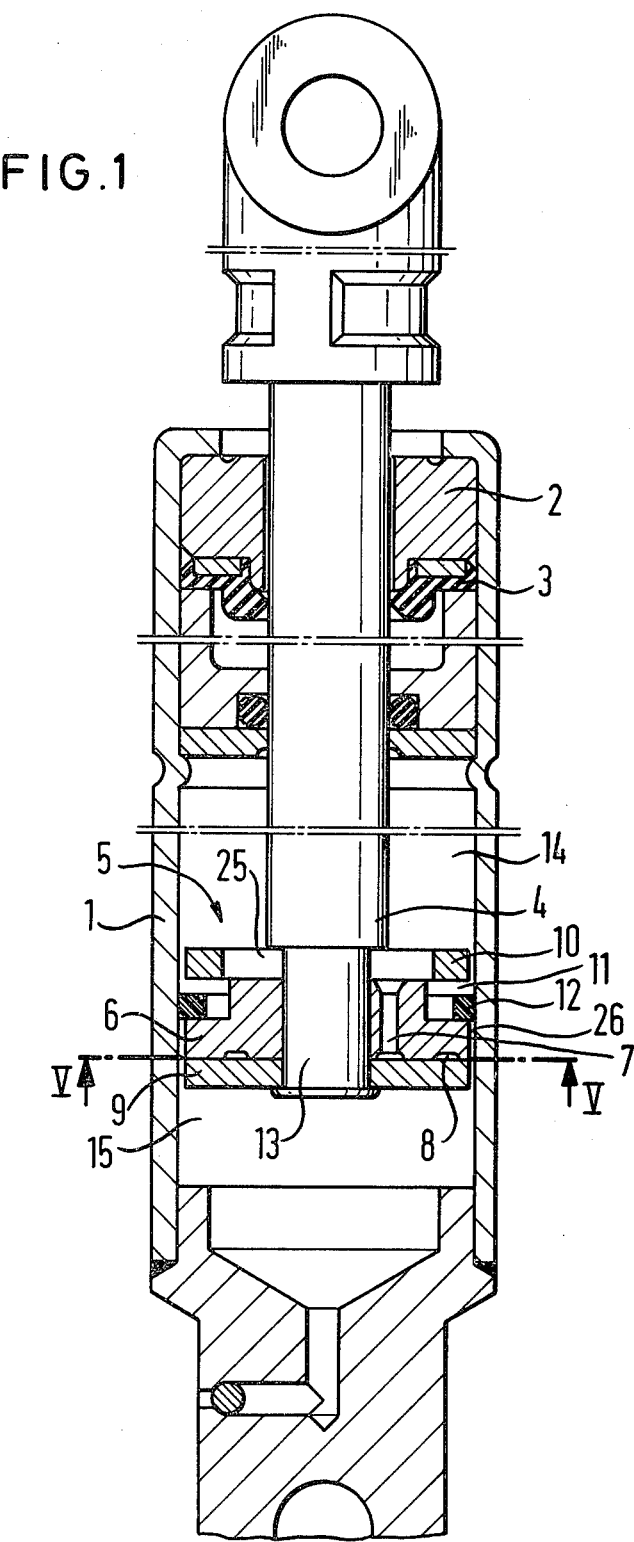
FIG. 1 shows a longitudinal section of a gas spring.
Figure 2:
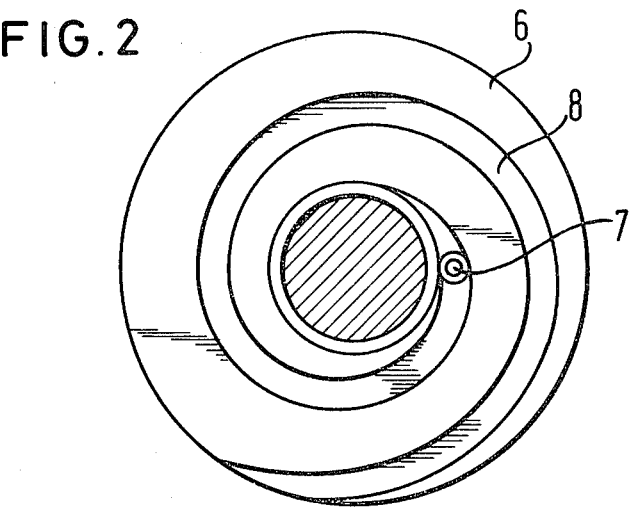
FIG. 2 is an end view of the piston body according to line V—V of FIG. 1.

The gas spring shown in FIG. 1 has a cylinder 1 in which slides a piston 5 connected to a piston rod 4. Guide means 2 for the piston rod 4 and the piston rod sealing means 3 are positioned at one end of the cylinder. The piston 5 mounted on the extension 13 of the piston rod 4 separates the cavity of the cylinder 1 into a working chamber 14 above the piston and into a working chamber 15 below the piston. These working chambers 14 and 15 are filled with pressurized gas. The piston 5 includes the piston body 6 disposed between the piston plate 9 and the piston disc 10. An annular recess within the piston body 6, together with the piston disc 10, define an annular groove 11 in the piston which is larger than a piston ring 12 both in axial and in radial direction. Thus the piston ring 12 which is in sealing engagement with the inner peripheral face of the cylinder 1 can be moved in the axial direction in the annular groove 11. The piston body 6 further comprises an axial bore 7 connected to the throttled channel 8. This axial bore 7 and the throttled channel 8 define the constantly open passage between the working chamber 14 and the working chamber 15. FIG. 2 shows the throttled channel 8 positioned within the piston body 6, and it can be seen that the axial bore 7 ends in the channel 8 in the region of the radially inner end thereof and that this channel 8 extends spirally on the lower front side of the piston body 6. The exit of the throttled channel 8 into the working chamber 15 extends approximately tangentially to the peripheral surface of the piston body 6. In order to achieve an undisturbed flow of the fluid into the working chamber 15, it is of advantage to provide the piston plate 9 with a diameter which is less than the diameter of the piston body 6.

The mode of operation of the gas spring shown in FIGS. 1 and 2 will be explained below. Due to the internal pressure of the gas spring, the outward thrust on the piston rod corresponds to the product of the pressure and the cross-sectional area of the piston rod. The rate at which the piston rod 4 moves out of the cylinder 1 is determined by the throttle means within the piston 5. During the movement of the piston rod 4 out of the cylinder 1, the damping medium flows through an opening 25 in the piston plate 10 and through the axial bore 7 into the throttled channel 8. The damping effect on the movement of the piston rod is substantially determined by the length and the cross-section of the spiral throttled channel 8 through which the damping medium flows into the working chamber 15. During this movement, the piston ring 12 engages the lower side face of the annular groove 11 of the piston (as shown in FIG. 1) due to the friction caused between the piston ring 12 and the inner peripheral face of the cylinder 1, so that the annular gap 26 between the piston 5 and the cylinder 1 is closed, with the result that the damping medium can flow from the working chamber 14 to the working chamber 15 only through the axial bore 7 and the throttled channel 8. Due to the spiral shape of the throttled channel 8, the length of the throttled channel can be relatively great, i.e. substantially greater than 360°. FIG. 1 clearly shows that the throttled channel is defined by the piston body 6 and the piston plate 9. This arrangement of the throttled channel allows a very simple manufacture.

When the piston rod 4 moves into the cylinder 1 under an externally applied force acting on the piston rod, the movement of the piston rod into the cylinder has the effect that the piston ring 12 in the annular groove 11 of the piston makes engagement with the inner side of the piston disc 10. Thus an additional flow cross-section is provided and the damping medium sequentially flows through the annular gap 26 between the piston body 6 and the cylinder 1 through the annular groove 11 of the piston and through the opening in the piston disc 10 from the working chamber 15 to the working chamber 14 without substantially damping the movement of the piston rod 4 into the cylinder 1.

Figure 3:
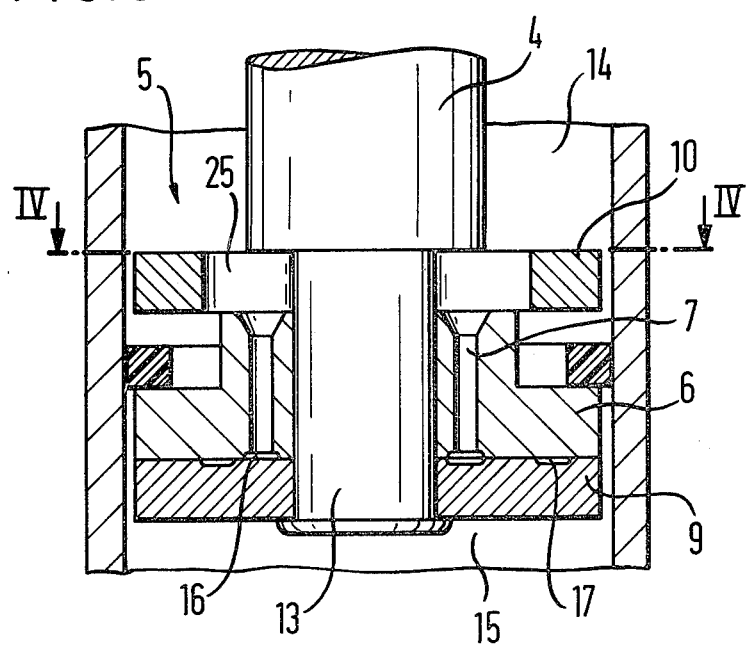
FIG. 3 shows a spiral throttled channel extending in the piston plate.
Figure 4:
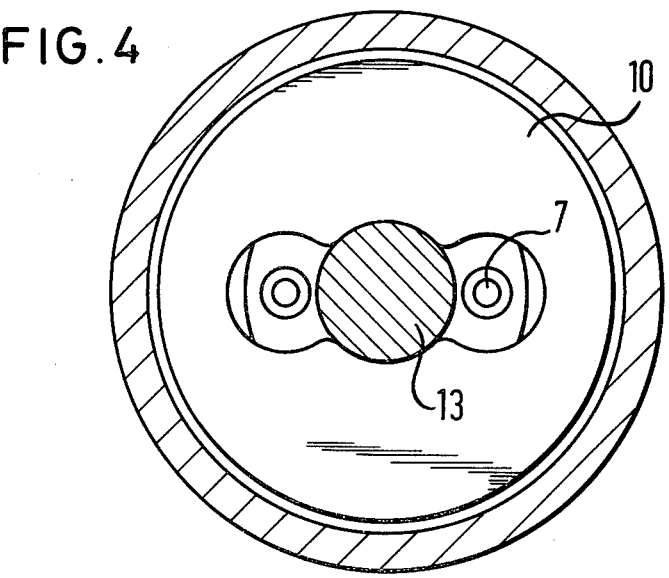
FIG. 4 is a top view of the piston unit on the line IV—IV of FIG. 3.

The embodiment shown in FIGS. 3 and 4 differs from that shown in FIGS. 1 and 2 principally in that a plurality of axial bores 7 are provided in the piston body 6 which terminate in an annular channel 16 extending in the piston body 6. In this embodiment, the piston 5 also includes the piston body 6 mounted on the extension 13 of the piston rod 4 between the piston disc 10 and the piston plate 9. A further difference resides in that the spiral throttled channel 17 extends in the piston plate 9 and is covered by the piston body 6. The annular channel 15 of the piston body 6 communicates with the throttled channel 17 in the region of the radially inner end of the throttled channel 17. When the piston rod 4 moves out of the cylinder 1, the damping medium flows from the working chamber 14 through the opening 25 in the piston disc 10 into the axial bores 7 and through the annular channel 16 into the throttled channel 17 and from there into the working chamber 15.

Figure 5:
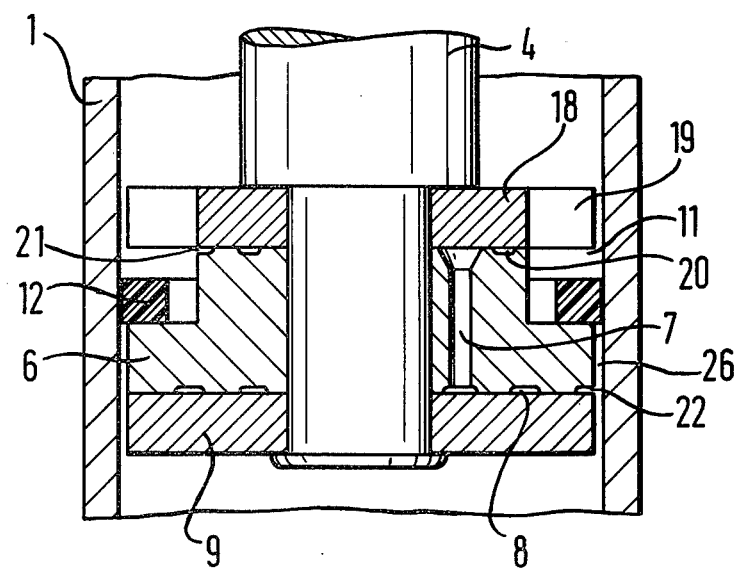
FIG. 5 shows a piston having spiral throttled channels extending in both front faces of the piston body.

In the embodiment shown in FIG. 5, the piston body 6 is provided with spiral throttled channels on both sides thereof. The throttled channel 20 covered by the piston disc 18 has an inlet slot 21 at its radially outer end, and terminates at its radially inner end in the axial bore 7. This axial bore 7 connects the throttled channel 20 to the throttled channel 8, which is covered by the piston plate 9 and has an outlet slot at its radially outer end. Thus, the throttled channels 8 and 20 are connected in series. In order to provide a substantially unrestricted flow passage defined by the piston and the inner wall of the cylinder 1 when the piston 4 and thus the piston move into the cylinder 1, the piston disc 18 is provided with recesses 19. At this stage of the movement of the piston rod into the cylinder, the piston ring 12 engages the contact face defined by the piston disc 18 due to the friction caused on the inner peripheral face of the cylinder 1. The recesses 19 and the annular groove 11 of the piston as well as the annular gap 26 defined between the piston body 6 and the cylinder 1 permit the unrestricted flow of the damping medium from the working chamber positioned below the piston into the working chamber positioned above the piston. Such a design is suited in particular for use in installations in which a great damping effect is needed when the piston rod moves out of the cylinder or when throttled channels having a relatively large cross-section are desired.

Although the invention has been described herein by reference to specific embodiments thereof, it will be understood that such embodiments are susceptible of variation and modification without departing from the inventive concepts disclosed. All such variations and modifications, therefore, are intended to be encompassed within the spirit and scope of the appended claims.

What I claim is:

1. In a piston adapted to be used in a pneumatic, hydraulic or hydropneumatic installation of the type including a cylinder filled with gas and/or liquid, comprising a piston slidably housed within said cylinder and separating the cylinder cavity into two working chambers, a piston rod connected to said piston and extending through guiding and sealing means provided at one end of said cylinder, and damping means in said piston comprising a constantly open throttled passage between said working chambers, the improvement wherein said constantly open throttled passage includes at least one spirally-shaped throttled channel, which extends in a plane perpendicular to the piston axis over an angle of more than 360°, and which is provided in one front face of the piston body and covered by one of a piston plate and a piston disc.

2. The piston of claim 1 wherein at least one axial bore is located within the piston body and terminates in the throttled channel in the radially inner area thereof.

3. The piston of claims 1 or 2 wherein the cross-section of each axial bore is larger than the cross-section of the throttled channel.

4. The piston of claims 1 or 2 wherein said throttled channel is provided in a piston plate, and the radially outer end of said throttled channel terminates in the adjacent working chamber.

5. The piston of claim 1 wherein at least one axial bore is located within the piston body, and spiral throttled channels are provided on both sides of said piston body and have their radially inner ends connected to the axial bore.

6. The piston of claims 1 or 5 wherein each throttled channel includes at least one of an inlet slot and an outlet slot for fluid communication with the adjacent working chamber, and said each slot is arranged approximately tangentially to the peripheral surface of the piston.

7. In a pneumatic, hydraulic or hydropneumatic installation of the type including a cylinder filled with gas and/or liquid, comprising a piston slidably housed within said cylinder and separating the cylinder cavity into two working chambers, a piston rod connected to said piston and extending through guiding and sealing means provided at one end of said cylinder, and damping means in said piston comprising a constantly open throttled passage between said working chambers, the improvement in said piston wherein said constantly open throttled passage includes at least one spirally-shaped throttled channel, which extends in a plane perpendicular to the piston axis over an angle of more than 360°, and which is provided in one end face of the piston body and covered by one of a piston plate and a piston disc.

* * * * *